United States Patent

Kahn

(10) Patent No.: US 8,794,593 B2
(45) Date of Patent: Aug. 5, 2014

(54) GATE VALVE ASSEMBLY WITH AN AXIALLY FLEXIBLE SEAT

(75) Inventor: Jon B. Kahn, Spring, TX (US)

(73) Assignee: Vetco Gray Inc., Houston, TX (US)

( * ) Notice: Subject to any disclaimer, the term of this patent is extended or adjusted under 35 U.S.C. 154(b) by 239 days.

(21) Appl. No.: 13/044,830

(22) Filed: Mar. 10, 2011

(65) Prior Publication Data

US 2012/0228537 A1 Sep. 13, 2012

(51) Int. Cl.
*F16K 3/00* (2006.01)
*F16K 1/16* (2006.01)
*F16K 1/42* (2006.01)
*F16K 25/00* (2006.01)
*F16K 3/02* (2006.01)

(52) U.S. Cl.
CPC .................................. *F16K 3/0227* (2013.01)
USPC ............ 251/328; 251/195; 251/302; 251/362

(58) Field of Classification Search
USPC ......... 251/326, 328, 317, 176, 198, 195, 196, 251/281, 283, 167, 174, 178, 299–302, 359, 251/362, 363, 364, 368; 137/601.2
See application file for complete search history.

(56) References Cited

U.S. PATENT DOCUMENTS

| 2,777,664 | A | * | 1/1957 | Bryant | 251/174 |
| 3,060,964 | A | * | 10/1962 | Bagwell | 137/601.15 |
| 3,650,508 | A | * | 3/1972 | Kosmala et al. | 251/174 |
| 4,120,482 | A | * | 10/1978 | Cox | 251/306 |
| 4,208,035 | A | | 6/1980 | Alvarez | |
| 4,671,489 | A | * | 6/1987 | Jankovic | 251/327 |
| 5,150,881 | A | * | 9/1992 | McKavanagh | 251/174 |
| 5,346,179 | A | | 9/1994 | Lochmann | |
| 5,762,320 | A | | 6/1998 | Williams | |
| 7,325,783 | B2 | | 2/2008 | Hunter | |

* cited by examiner

*Primary Examiner* — John K Fristoe, Jr.
*Assistant Examiner* — Hailey K Do
(74) *Attorney, Agent, or Firm* — Bracewell & Giuliani LLP

(57) ABSTRACT

A gate valve assembly having metallic valve seats that are axially resilient and maintain a static sealing interface between the valve seat and a body pocket and a sliding dynamic sealing interface between the valve seat and a gate in the valve assembly. The valve seats are annular members having slots formed radially through the valve seats from the inner and outer circumferences. Sleeves may be provided that are coaxial to the valve seats; the sleeves may be on the inner surface of the valve seats, outer surface of the valve seats, or both. Shims may optionally be set in the slots.

11 Claims, 3 Drawing Sheets

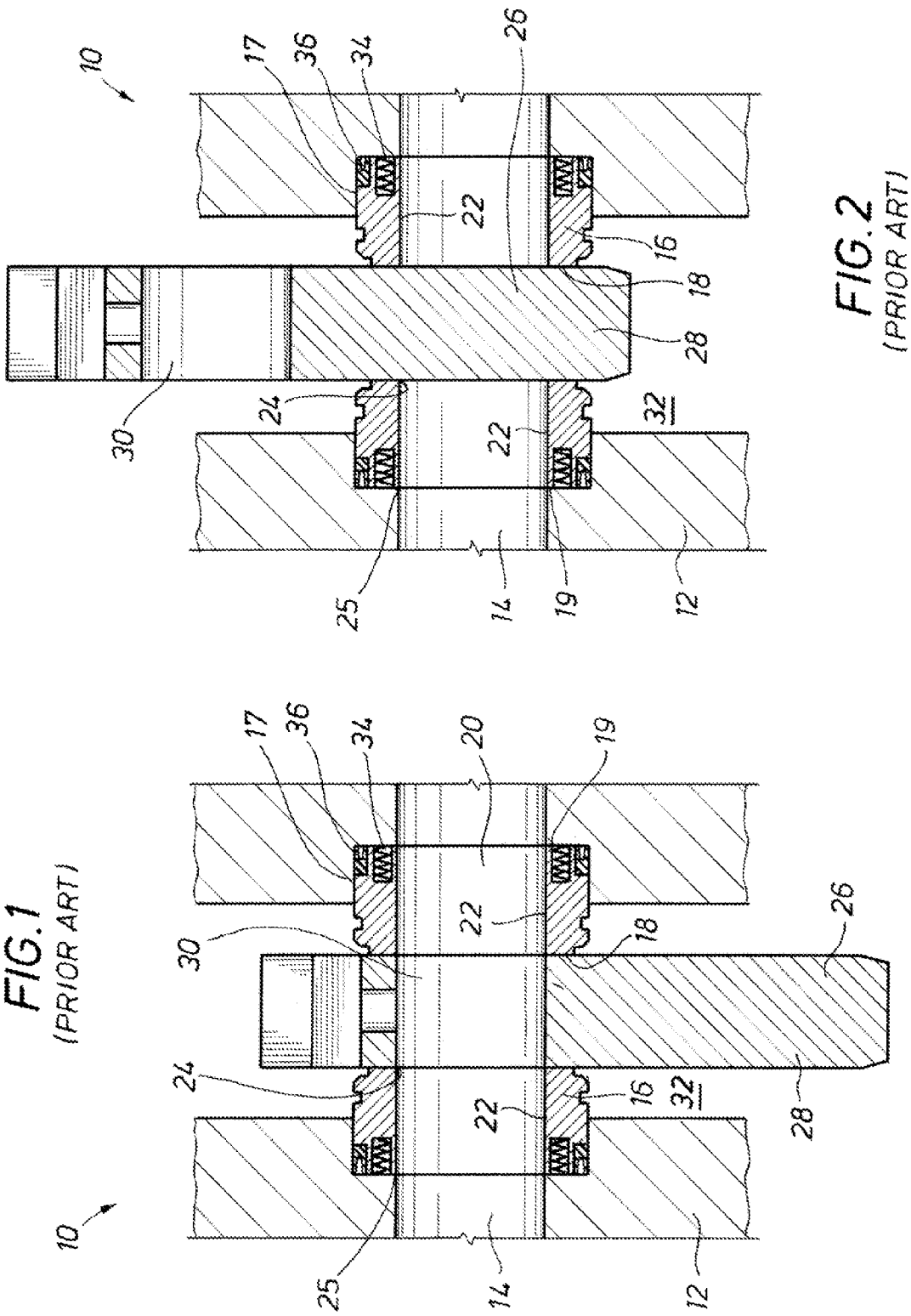

GATE VALVE ASSEMBLY WITH AN AXIALLY FLEXIBLE SEAT

FIELD OF INVENTION

This invention relates in general to gate valves used in the oil and gas industry, and in particular to a gate valve assembly with a valve seat that is metallic and axially flexible.

DESCRIPTION OF RELATED ART

Referring to FIGS. 1 and 2, a standard bidirectional gate valve 10 as used in the oil and gas production industry according to the prior art is illustrated. Valve 10 has a body 12 with a flow passage 14 extending there through. A pair of ring-shaped seats 16 rest in body pockets 17 formed in body 12. Seats 16 each have a front face 18 on a side facing away from the body pocket 17 and a back face 19 that sits in the body pocket 17. An annular bore 20 in the seats 12 defines an inner wall 22 with a diameter that is approximately equal to the flow passage 14 inside diameter. A gate 26 is positioned between the seats 16. Gate 26 has a solid portion 28 against which the front face 18 is pressed. When the gate valve 10 is in an open position, a hole 30 through the solid portion 28 registers with the bore 20 allowing flow through the valve 10.

The gate 26 is movable relative to the front faces 18 of the seats 16 with a cavity 32 in the body 12 that circumscribes the seats 16. Shown in FIG. 2, the gate 26 has moved with respect to its position in FIG. 1, taking the hole 30 out of registration with the bore 20 to close the valve. Whether the valve 10 is in the open or closed position, the seat front faces 18 are generally urged against the gate 26 to prevent fluid leakage from the bore 20 into the cavity 32. While this inboard action is typically initiated by springs 34 or the resiliency of face seals 36 at the rear of the valve seat, it is primarily completed by the differential pressure between the upstream bore 20 and the cavity 32 acting across the diameter of the seat seal 36. The springs 34 are set in a circular groove formed on the back face 19 of each valve seat 16. A seat body seal 36 is often provided in an annular groove on the outer periphery of each back face 19 for sealing between the back face 19 and body pocket 17. Because of the need to accommodate thermal expansion/contraction from temperature transients, as well as manufacturing tolerances, there is a certain axial slop of the two seats 16, 18 plus the gate 26 as they fit between the body pockets 17. As the valve is pressurized from the upstream bore, the upstream seat 18 is first pressed against the gate 26 which in turn is pressed against the downstream seat 16 which in turn is bottomed out against the downstream body pocket 17. This axial motion of the seats 16, 18 relative to the body pockets 17 means that the seat seal 36 must be designed to act across a dynamic interface. Maintaining a seal between dynamic interfaces is problematic when there is a large range of pressure differentials across the seal. Moreover, as the seat body seal 36 is typically formed from a polymer, which can degrade over time from downhole thermal variations, the back face 19 and body pocket 17 interface is subject to leakage.

SUMMARY OF INVENTION

Disclosed herein is a gate valve assembly, in an example embodiment the gate valve assembly includes a body, a gate in the body that can move between an open and a closed position, and a resilient annular valve seat in the body. The valve seat can expand and contract while maintaining a dynamic sealing interface with the gate and a static sealing interface with the pocket in the valve body. Also, the valve seat has walls that form a pressure barrier. Slots may be included in the mid portion of the valve seat that are formed on the inner and outer circumference of the valve seat and circumscribe an axis of the valve seat. In one example embodiment, shims may be disposed in the slots. The valve seat can include a recess along a portion of its inner circumference that extends from the body to a shoulder on the inner circumference of the valve seat. A sleeve can be set in the recess that forms a gap between the sleeve and the base, so that when the valve seat is compressed, compression of the valve seat is limited when the sleeve becomes wedged between the shoulder and the body. The recess and sleeve can be on the inner circumference of the valve seat or on the outer circumference. The body can further include a cavity for gate travel intersected by a flow passage through the body. Optionally, a bypass can be included in the body between the flow passage and the cavity and a check valve in the bypass. In an example embodiment the flow passage is an upstream flow passage on one side of the cavity and is a downstream flow passage on an opposite side of the cavity and wherein the bypass is an upstream bypass and extends between the upstream flow passage and the cavity, the gate valve assembly may also include a downstream bypass in the body extending between the cavity and the downstream flow passage and a check valve in the downstream bypass. In an example embodiment the check valve in the upstream bypass allows flow from the upstream flow passage to the cavity and blocks flow from the cavity to the upstream flow passage. In an example embodiment, the check valve in the downstream bypass allows flow from the downstream flow passage to the cavity and blocks flow from the cavity to the downstream flow passage.

Also disclosed herein is a valve seat for use in a gate valve assembly. In an example embodiment the valve seat is made of an annular body with a rearward end for mounting to a body of a valve assembly and a forward end distal from the rearward end. A face is included on the forward end of the annular body for forming a static sealing interface with a valve member. A face is also included on the rearward end of the annular body for forming a static sealing interface with a pocket in the body of the valve assembly. The valve seat includes a resilient mid portion between the forward end and the rearward end. The resilient mid portion exerts an initial axial force on the forward and the rearward ends. Once the valve is closed, the pressure differential builds between the upstream flow passage and the cavity, causing the slots 72 in the mid portion of the upstream valve seat 70 to expand, creating an additional force between the upstream seat 70 and the gate 54. This may be considered analogous to "inflating" an accordion. It is this expansion which is a substitute for the traditional valve seat's shifting action and maintains interfaces on both ends that define a pressure barrier between an inner circumference and an outer circumference of the annular body. In an example embodiment, slots are provided in the mid portion that provide axial resiliency in the annular body. The slots can extend from an outer terminal radius of the annular body towards an axis of the annular body, can extend from an inner terminal radius of the annular body towards the inner terminal radius of the annular body, or both from the inner and outer terminal radii. In an optional embodiment, a shoulder is included on the inner terminal radius of the annular body defined by a recess that extends on the inner terminal radius of the annular body from the shoulder to the rearward end. A sleeve can be included in the recess. In an optional embodiment, a shoulder is included on the outer terminal radius of the annular body defined by a recess that extends on the outer terminal radius of the annular body from the shoulder to the rearward end. A sleeve can be included in the recess on the outer radius. In an example embodiment, the shoulder is a forward shoulder and the end of the recess is a forward end, the valve seat further comprising a rearward shoulder on the outer terminal radius of the annular body distal from the forward shoulder and defining a rearward end of the recess and a sleeve in the recess having a length less than the length of the recess. Optionally, shims may be disposed in the slots, the shims having a thickness less than a thickness of the slots. The sleeves or shims assist in the structural integrity of the downstream seat while under the high compressive loads created by the expansion of the upstream seat pressing against the gate.

BRIEF DESCRIPTION OF THE DRAWINGS

Some of the features and benefits of the present invention having been stated, others will become apparent as the description proceeds when taken in conjunction with the accompanying drawings, in which:

FIG. 1 is a sectional view of a typical gate valve according to the prior art with the gate in an open position.

FIG. 2 is a sectional view of the gate valve of FIG. 1 with the gate in a closed position.

Figure 3:
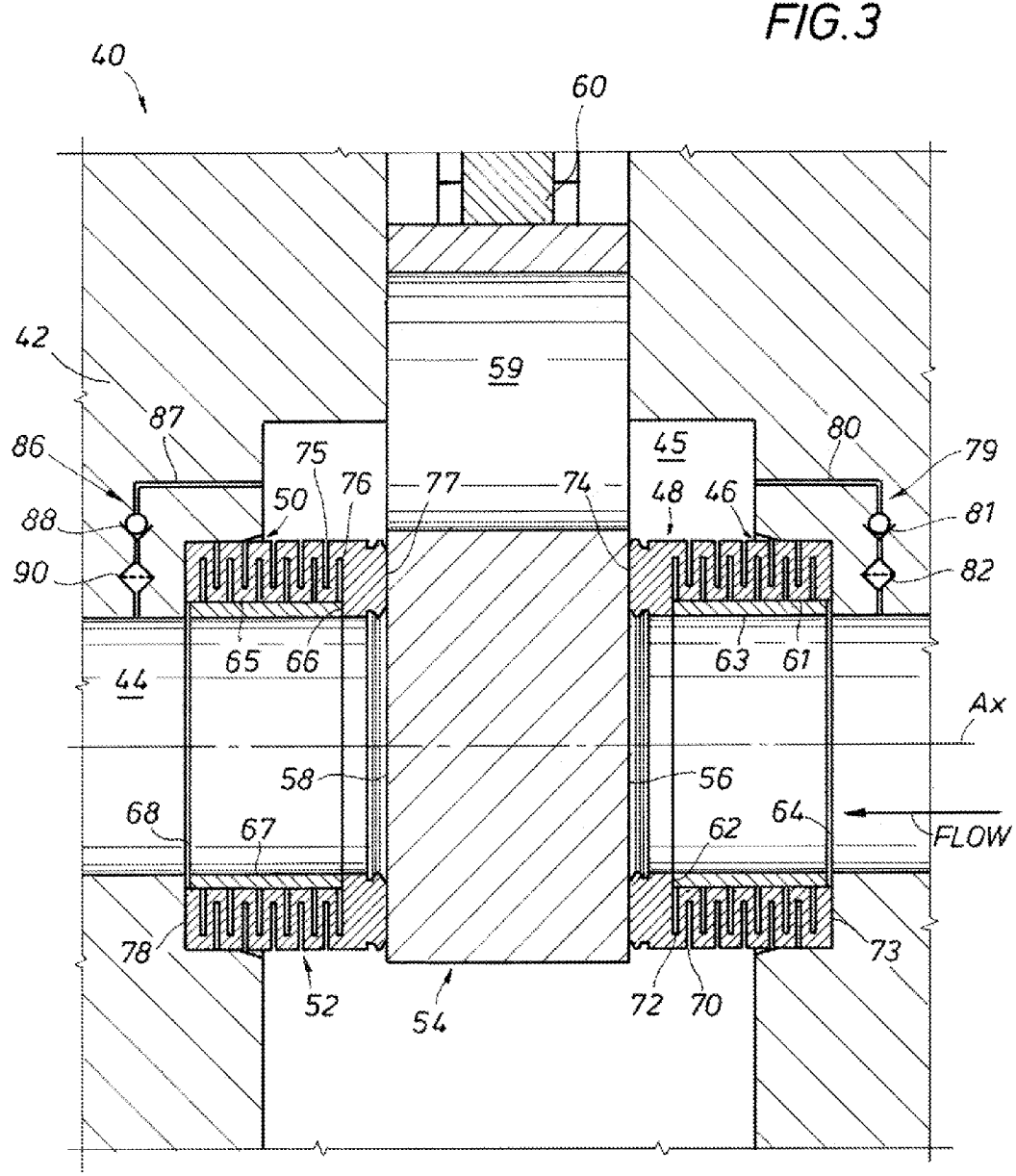
FIG. 3 is a side sectional view of an example embodiment of a gate valve in accordance with the present invention.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

It is to be understood that the invention is not limited to the exact details of construction, operation, exact materials, or embodiments shown and described, as modifications and equivalents will be apparent to one skilled in the art. In the drawings and specification, there have been disclosed illustrative embodiments of the invention and, although specific terms are employed, they are used in a generic and descriptive sense only and not for the purpose of limitation. Accordingly, the invention is therefore to be limited only by the scope of the appended claims.

An example embodiment of a gate valve assembly 40 (which may be bidirectional) is shown in a side sectional view in FIG. 3. The gate valve assembly 40 includes a body 42 with a flow passage (bore) 44 formed lengthwise through the body 42. A cavity 45 is also provided in the body 42 in a direction oriented generally transverse to the flow passage 44. An upstream body pocket 46 is shown in the body 42 that extends radially outward from the flow passage 44 a distance into the body 42. The body pocket 46 extends laterally in a direction generally parallel with the axis $A_X$, and terminating at the cavity 45. An annular upstream valve seat 48 is shown set within the upstream body pocket 46 and oriented generally coaxial with the axis $A_X$. A downstream body pocket 50 is also formed within the body 42 that mirrors the upstream body pocket 46 and on an opposite side of the cavity 45. An annular downstream valve seat 52 is set within the downstream body pocket 50 and coaxial with the axis $A_X$.

A gate 54 is shown disposed in the cavity 45 and having an elongate direction transverse to the axis $A_X$. The gate has an upstream side 56 shown in sealing contact with an end of the upstream valve seat 48 opposite the end set in the upstream body pocket 46. Similarly, on a side of the gate 54 opposite the upstream side 56 is a downstream side 58 is sealing contact with an end of the downstream valve seat 52.

In the configuration of FIG. 3, the gate valve assembly 40 is in the closed position wherein a solid portion of the gate 54 is set within the flow passage 44 and blocking any flow there through. The sealing interfaces between the upstream and downstream surfaces 56, 58 and the upstream and downstream valve seats 48, 52 prevent flow from within the flow passage 44 and into the surrounding cavity 45. The gate 54 is movable within the cavity 45 so that the valve passage 44 can register with an opening 59 formed laterally through the gate 54. Moving the gate 54 within the cavity 45 may be accomplished by a force applied to a valve stem 60 shown attached to an upper end of the gate 54.

Referring back to the upstream valve seat 48, an annular recess 61 is shown extending along the inner radius of the valve seat 48 from its end set in the upstream body pocket 46. A shoulder 62 is defined at the terminal end of the recess 61. An annular sleeve 63 is shown disposed within the recess 61 and has a length exceeded by the recess 61. The difference between the respective lengths of the recess 61 and sleeve 63 defines a gap 64 shown between an end of the sleeve 63 and bottom of the body pocket 46. Shown provided on the downstream valve seat 52 is a similar recess 65 forming a shoulder 66 on the inner circumference of the downstream valve seat 52. A sleeve 67 is shown set within the recess 65 and having a gap 68 between an end of the sleeve 67 and body pocket 50. It should be pointed out however that the gap 64, 68 may be between the sleeves 63, 67 and shoulders 62, 66.

Shown formed within the upstream valve seat 48 are a series of outer slots 70 that extend from an outer surface of the valve seat 48 and radially inward and terminating within the body of the upstream valve seat 48. The slots 70 are shown spaced apart at substantially consistent distances, but may optionally have different distances between them that can increase or decrease linearly or exponentially. Further, the radial distance of the slots 70 may, vary from slot to slot. In the embodiment of FIG. 3 the slots extend 360 degrees around the entire circumference of the valve seat 48, embodiments exist however where the angular distance around the valve seat 48 of the slot 70 is something less than 360 degrees. Inside slots 72 are also formed in the valve seat 48 that begin at the inner circumference or radius of the valve seat 48 and project radially outward from the axis $A_X$ and terminating within the body of the valve seat 48. The slots 70, 72 of FIG. 3 are shown substantially perpendicular to the axis $A_X$, but embodiments exist where the slots 70, 72 may be oblique to the axis $A_X$, and instead of the substantially straight path shown may have curved or undulating paths. Moreover, while the opposing walls of the slots 70, 72 are illustrated as being substantially parallel, embodiments exist wherein the opposing walls are angled with respect to one another and converge into a "v" shaped configuration at the base of each of the slots 70, 72.

In an embodiment, the slots 70, 72 define a series of cantilevers along the axial length of the valve seat 48 so that the valve seat 48 may have a resilient function with spring-like qualities. More specifically, the valve seat 48 may expand or contract along the axis $A_X$, but due to the resilient function provided by the slots 70, 72, a static sealing interface may be maintained between the upstream body pocket 46 and rearward end of the valve seat 48 while still maintaining constant contact between the upstream side 56 of the gate 54 and forward end of the valve seat 48. The rearward end of the valve seat 48 that contacts the upstream body pocket 46 forms a rearward face 73 and the end of the valve seat 48 contacting the gate 54 forms a forward face 74, on which a static sealing force is maintained by the valve seat 48 in both of extended or compressed states. This static, metal-to-metal sealing interface between the seat 48 and the body 42 provides one of the advantages disclosed herein. Advantages of this interface relative to a conventional polymer radial or face seal include: (1) static metal-to-metal sealing is considerably more tolerant of both low and high temperatures than a dynamic polymer seal; (2) static metal-to-metal sealing can be considerably more tolerant of degradation due to chemical exposure than a dynamic polymer seal; (3) no rubbing and/or sliding contact occurs on static interfaces that may occur with dynamic interfaces, which introduces the potential for wear and/or galling; and (4) the rearward end of the valve seat 48 may be designed such that it is installed with an interference fit, assembled either by force-pressing or thermally shrinking the seat while simultaneously heating the valve body, thus creating an interface that is beyond the category of a 'seal', more like that of a weld. In this case, the leak path is removed from critical analysis studies typical for performance and safety. With this configuration properly installed, there is no chance of contaminants or fluids encroaching the boundary between the seat and body.

The downstream valve seat 52 is shown having outside slots 75 similar in construction and example embodiments of the slots 70 in the upstream valve seat 48, and inside slots 76 that are similar to the inside slot 72 in the upstream valve seat 48. Further, the downstream valve seat 52 is shown having a sealing face 77 on the upward facing end of the valve seat 54 in contact with the downstream side of the gate 54. Along the sealing face 77 a static sealing interface between the flow passage 44 and cavity 45 is maintained. The rearward end of the valve seat 52 that contacts the upstream body pocket 65 forms a rearward face 78, along which a static sealing interface is maintained by the resilient valve seat 52. An additional advantage of the resilient nature of the valve seats 48, 52 is that their inherent resiliency enables the implementation of entirely, or substantially entirely metallic, valve seat for use in the valve assembly 40. As is known, an advantage of a metal over elastomeric or other nonmetal material is the extended life of the component when subjected to repeated cyclings of movement of the gate 54 as well as the ability to function in extreme temperatures and/or pressures. Example materials for use in the valve seats 48, 50 includes nickel alloy such as Inconel®, or, Inconel 718, Inconel 625, Inconel 625 plus. Other alloy be those made from cobalt, titanium, as well as stainless steel.

In one optional embodiment the valve assembly 40 may include a bypass circuit 79 for providing fluid communication through the body 42 and between the flow passage 44 and cavity 45. In the embodiment of FIG. 3, the flow circuit 79 includes a flow line 80 in which is a check valve 81 for allowing flow from the flow passage 44 and into the cavity 45 but preventing backflow from the cavity 45 and into the flow passage 44. An optional screened filter 82 may be included in the flow circuit for filtering particulate. A similar flow circuit 86 is provided in the downstream portion of the valve body 42. The bypass circuit 86 includes a bypass line 87 between the flow passage and cavity 45 and through the body 42. A check valve 88 allows flow from the flow line 44 into the cavity 45 while preventing flow from the cavity 45 into the flow passage 44. An optional filter 90 is shown for straining particulate and other matter from fluid flowing through the line 44.

Figure 4:
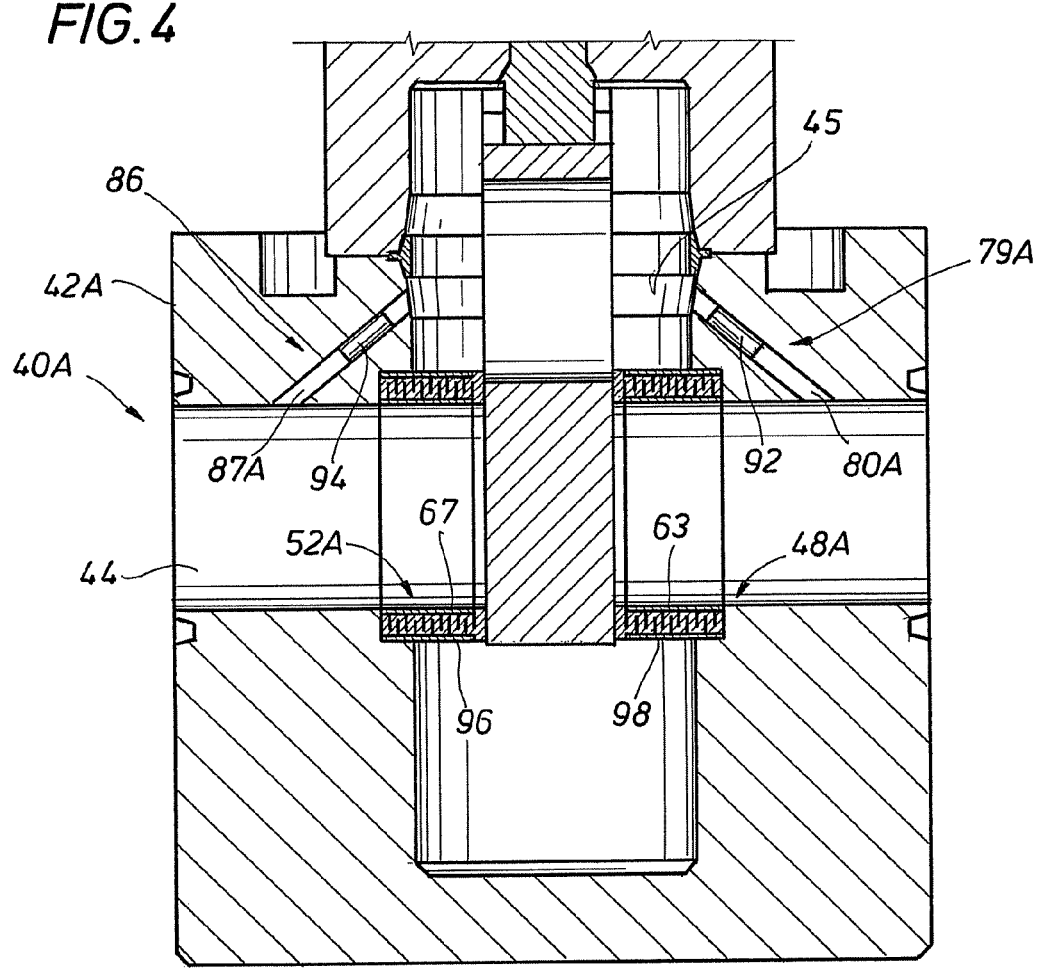
FIG. 4 is a side sectional view of an example embodiment of a gate valve in accordance with the present invention.

Referring now to FIG. 4, an alternate embodiment of a valve assembly 40A is shown in a side sectional view. In the embodiment of FIG. 4 alternate bypass circuits 79A, 86A are shown formed through the body 42A between the flow passage 44 and cavity 45. In the embodiment of FIG. 4, the bypass circuits 79A, 86A include bypass lines 80A, 87A with inline modules 92, 94, wherein the modules 92, 94 include a check valve (not shown) and optionally a screen (not shown). The check valves allow flow from the flow passage 44 to the cavity 45 while preventing flow from the cavity 45 to the flow passage 44. Also shown in FIG. 4 are outer sleeves 96, 98 circumscribing the upstream and downstream valve seats 48A, 52A and substantially coaxially with the sleeves 63, 67. The outer sleeves 96, 98 are set in recesses formed in the outer circumference of the valve seats 48A, 52 that define shoulders similar to the shoulders 62, 66 in the embodiments of the valve seats 48, 52 of FIG. 3.

Figure 5:
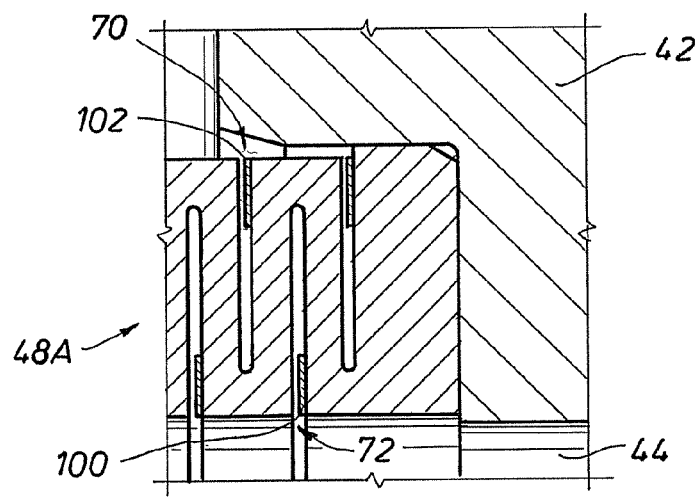
FIG. 5 is a sectional view of a portion a gate valve embodiment having a valve seat with slots and shims in the slots, in accordance with the present invention.

Shown in a cross sectional view in FIG. 5 is an alternate embodiment of a valve seat 48A in which shims 100, 102 are shown inserted within the open ends of the slots 72, 75. Strategically disposing the shims 100, 102 within each or some of the slots 72, 75 provides some ranges of flexibility of the resiliency of the valve seat 48A. It should be pointed out, that although the upstream valve seat 48A is shown in FIG. 5, embodiments exist wherein the downstream valve seat is equipped with corresponding shims 100, 102 in its slots.

The present method described herein, therefore, is well adapted to carry out and attain the ends and advantages mentioned, as well as others inherent therein. While a presently preferred embodiment has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A gate valve assembly comprising:
a body having a valve seat pocket;
a gate moveable in the body between an open and a closed position;
a resilient annular metal valve seat mounted in the body, having a bore with a flow passage axis and changeable from an elongate configuration with a rearward end in static sealing contact with the valve seat pocket in the body and a forward end in dynamic sealing contact with the gate to a compressed configuration with the rearward end in static sealing contact with the valve seat pocket in the body and the forward end in dynamic sealing contact with the gate and having a mid-portion between the forward end and the body that defines a pressure barrier;
wherein the rearward end, the mid-portion and the forward end of the valve seat are integrally formed from a single piece of metal;
at least two circumferentially extending inner slots in the bore within the mid-portion of the valve seat;

at least two circumferentially extending outer slots on an outer circumference of the mid-portion of the valve seat, the inner slots and the outer slots alternating with each other, defining a serpentine wall of the valve seat that has an axial thickness greater than an axial width of each of the inner and outer slots;

an annular bore recess on a curved surface of the bore of the mid-portion of the valve seat, the bore recess defining an inner forward shoulder on the valve seat that faces toward the valve seat pocket in the body;

an inner sleeve in the bore recess and coaxial with the valve seat, the inner sleeve having a forward end and a rearward end;

an annular outer recess on a curved surface of the outer circumference of the mid-portion of the valve seat, the outer recess defining an outer forward shoulder on the valve seat that faces toward the valve seat pocket in the body;

an outer sleeve in the outer recess, the outer sleeve having a forward end and a rearward end;

wherein the inner sleeve and the outer sleeve each have a length less than a distance from the inner and outer forward shoulders to the valve seat pocket when the valve seat is in the elongate configuration; and wherein the forward ends of the inner sleeve and the outer sleeve contact the inner forward shoulder and the outer forward shoulder, respectively, and the rearward ends of the inner sleeve and the outer sleeve engage the valve seat pocket when the valve seat is in the compressed configuration.

2. The gate valve assembly of claim 1, wherein:
the rearward end of the inner sleeve and the rearward end of the valve seat are axially movable relative to each other.

3. The gate valve assembly of claim 1, wherein:
the rearward end of the outer sleeve and the rearward end of the valve seat are axially movable relative to each other.

4. The gate valve assembly of claim 1, wherein:
the rearward end of the inner sleeve and the rearward end of the valve seat are axially movable relative to each other; and
the rearward end of the outer sleeve and the rearward end of the valve seat are axially movable relative to each other.

5. The gate valve assembly of claim 1, wherein the body further comprises a cavity in which the gate travels and a flow passage through the body that intersects the cavity, the gate valve assembly further comprising a bypass through the body between the flow passage and the cavity and a check valve in the bypass.

6. The gate valve assembly of claim 5, wherein the flow passage is an upstream flow passage on one side of the cavity and a downstream flow passage on an opposite side of the cavity and wherein the bypass is an upstream bypass and extends between the upstream flow passage and the cavity, the gate valve assembly further comprising a downstream bypass in the body extending between the cavity and the downstream flow passage and a check valve in the downstream bypass.

7. The gate valve assembly of claim 6, wherein the check valve in the upstream bypass allows flow from the upstream flow passage to the cavity and blocks flow from the cavity to the upstream flow passage and wherein the check valve in the downstream bypass allows flow from the downstream flow passage to the cavity and blocks flow from the cavity to the downstream flow passage.

8. A valve seat for use in a gate valve assembly comprising:
a metallic annular valve seat body having an axis, a bore, a rearward end for mounting to a gate valve body of a gate valve assembly and a forward end distal from the rearward end;

the rearward end of the metallic annular valve seat body adapted to be in static sealing interface with a valve body pocket in the gate valve body;

a face on the forward end of the metallic annular valve seat body for sliding sealing interface with a gate;

a resilient mid-portion disposed between the forward end and the rearward end that exerts an axial force on the forward end for maintaining the static sealing interface and the sliding sealing interface and that defines a pressure barrier between an inner circumference and an outer circumference of the metallic annular valve seat body;

outer slots formed in a curved outer surface of the mid-portion and inner slots formed in the bore, the outer and inner slots alternating with each other to define a series of cantilevers along an axial length of the body that are substantially parallel with the face on the forward end of the valve seat body;

the outer and inner slots having axial widths that are less than a wall thickness of each of the cantilevers;

outer shims disposed in the outer slots, the outer shims having a thickness less than the width of the outer slots to limit compression of the mid-portion before the outer slots completely close in response to axial compression of the mid-portion of the valve seat;

each of the outer shims having an outer diameter flush with an outer diameter of each of the outer slots;

each of the outer shims having an inner diameter spaced radially outward from an inner diameter of each of the outer slots;

inner shims disposed in the inner slots, the inner shims having a thickness less than the width of the inner slots to limit compression of the mid-portion before the inner slots completely close in response to axial compression of the mid-portion of the valve seat;

each of the inner shims having an inner diameter flush with an inner diameter of each of the inner slots; and each of the inner shims having an outer diameter spaced radially inward from an outer diameter of each of the inner slots.

9. A gate valve assembly comprising:
a valve body having a central cavity intersected by upstream and downstream flow passages that are coaxial with each other along a flow passage axis;

a valve seat pocket formed in the valve body at each intersection of one of the flow passages with the central cavity;

a gate moveable in the cavity of the valve body between an open and a closed position;

a resilient annular metal valve seat mounted in each of the valve seat pockets, each of the resilient annular metal valve seats comprising:

a seat body having a bore, a rearward end secured with an interference fit in one of the pockets and a forward end in dynamic sealing contact with the gate, the seat body, including the rearward end and forward end being integrally formed from a single piece of metal;

at least two circumferentially extending inner slots within the bore;

at least two circumferentially extending outer slots on a circumference of the seat body, the inner slots and the outer slots alternating with each other along the axis, the inner and the outer slots allowing contraction and expansion of the seat body in response to engagement of the forward end by the gate;

an outer supporting device on the seat body that provides a limit for contraction of the seat body; and an inner supporting device on the seat body that is separate from the outer supporting device and which provides another limit for contraction of the seat body; and wherein the inner supporting device is located radially inward from the outer supporting device.

10. The gate valve according to claim 9, wherein:

the outer supporting device comprises an outer sleeve surrounding the seat body; and the inner supporting device comprises an inner sleeve located in the bore.

11. The gate valve according to claim 9, wherein:

the outer supporting device comprises outer shims located in the outer slots, the outer shims having a radial dimension less than a radial dimension of the outer slots; and having outer diameters flush with outer diameters of the outer slots; and the inner supporting device comprises inner shims located in the inner slots, the inner shims having a radial dimension less than a radial dimension of the inner slots and having inner diameters flush with inner diameters of the inner slots.

\* \* \* \* \*